(12) United States Patent
Lee et al.

(10) Patent No.: US 11,423,873 B2
(45) Date of Patent: Aug. 23, 2022

(54) ACTIVE NOISE CONTROL FOR VEHICLE WINDSHIELD NOISE

(71) Applicant: Toyota Motor Engineering & Manufacturing North America, Inc., Plano, TX (US)

(72) Inventors: Taehwa Lee, Ann Arbor, MI (US); Xiaopeng Li, Ann Arbor, MI (US); Jae Seung Lee, Ann Arbor, MI (US); Danil V. Prokhorov, Canton, MI (US); Hideo Iizuka, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 17/155,858

(22) Filed: Jan. 22, 2021

(65) Prior Publication Data

US 2022/0130367 A1    Apr. 28, 2022

Related U.S. Application Data

(60) Provisional application No. 63/105,933, filed on Oct. 27, 2020.

(51) Int. Cl.
*G10K 11/178* (2006.01)
*G01S 7/481* (2006.01)
*G01S 17/88* (2006.01)

(52) U.S. Cl.
CPC ...... *G10K 11/17879* (2018.01); *G01S 7/4817* (2013.01); *G01S 17/88* (2013.01); *G10K 11/17857* (2018.01); *G10K 2210/111* (2013.01); *G10K 2210/12821* (2013.01)

(58) Field of Classification Search
CPC ....... G10K 11/17879; G10K 11/17857; G10K 2210/111; G10K 2210/12821; G01S 7/4817; G01S 17/88
USPC ........................................................ 381/71.4
See application file for complete search history.

(56) References Cited

U.S. PATENT DOCUMENTS 5,757,943 A * 5/1998 Arledge, Jr. ............. H04R 1/08
                                                        381/26
10,440,480 B2   10/2019 Butts et al.

FOREIGN PATENT DOCUMENTS

CN        107093429 A    8/2017
EP          2594853 A1   5/2013

OTHER PUBLICATIONS

Emax-3100 User Manual (Laser Monitoring System, Electromax International, Inc., at least available by 2017) (Year: 2017).*

(Continued)

*Primary Examiner* — Vivian C Chin
*Assistant Examiner* — Douglas J Suthers
(74) *Attorney, Agent, or Firm* — Christopher G. Darrow; Darrow Mustafa, PC

(57) ABSTRACT

A system is provided for actively mitigating noise caused by vibration of a thin vehicle front windshield in an occupant compartment of a vehicle. The system includes a pair of laser scanners configured to be mountable inside the vehicle occupant compartment. Each laser scanner is configurable to scan an associated initial portion of the windshield simultaneously with the other laser scanner, when the windshield is vibrating.

19 Claims, 10 Drawing Sheets

(56) References Cited

OTHER PUBLICATIONS

Szczys, "Laser Mic Makes Eavesdropping Remarkably Simple", Hackaday.com, found at: http://www.electromax.com/aser.html (dated Sep. 25, 2010).

"Laser Microphone", Instructables Circuits, found at: https://www.instructables.com/id/LASER-MICROPHONE/., (accessed Sep. 2, 2020).

* cited by examiner

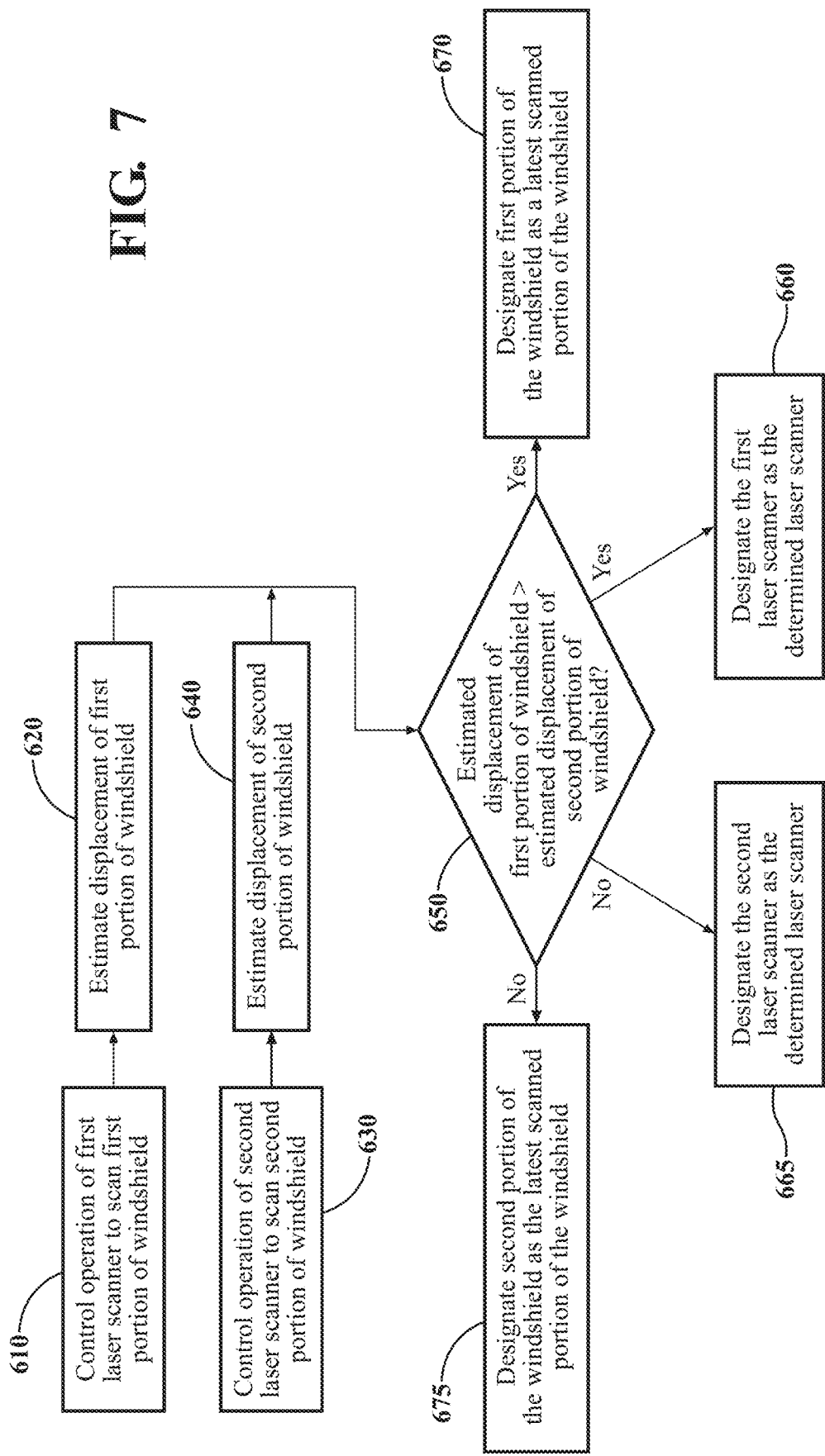

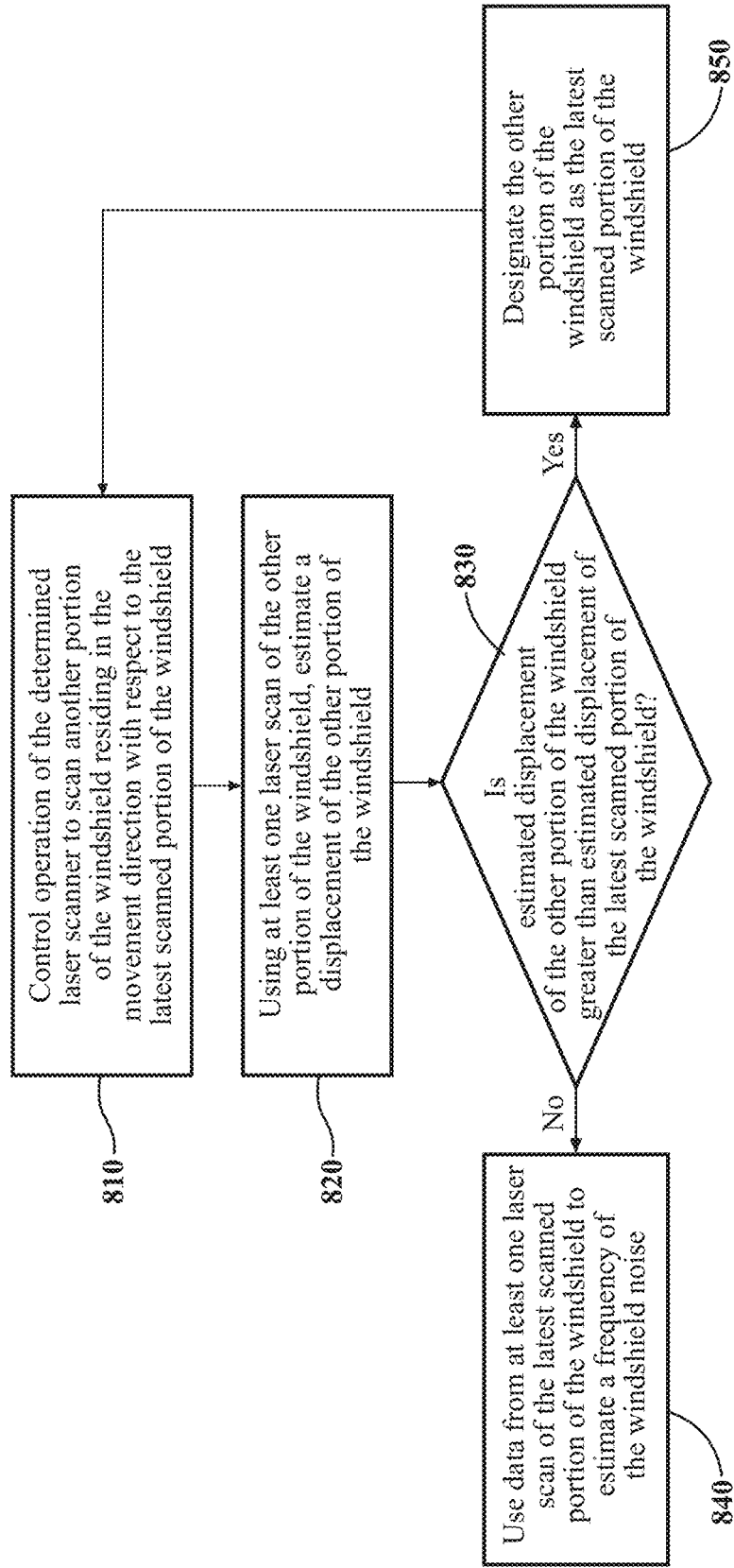

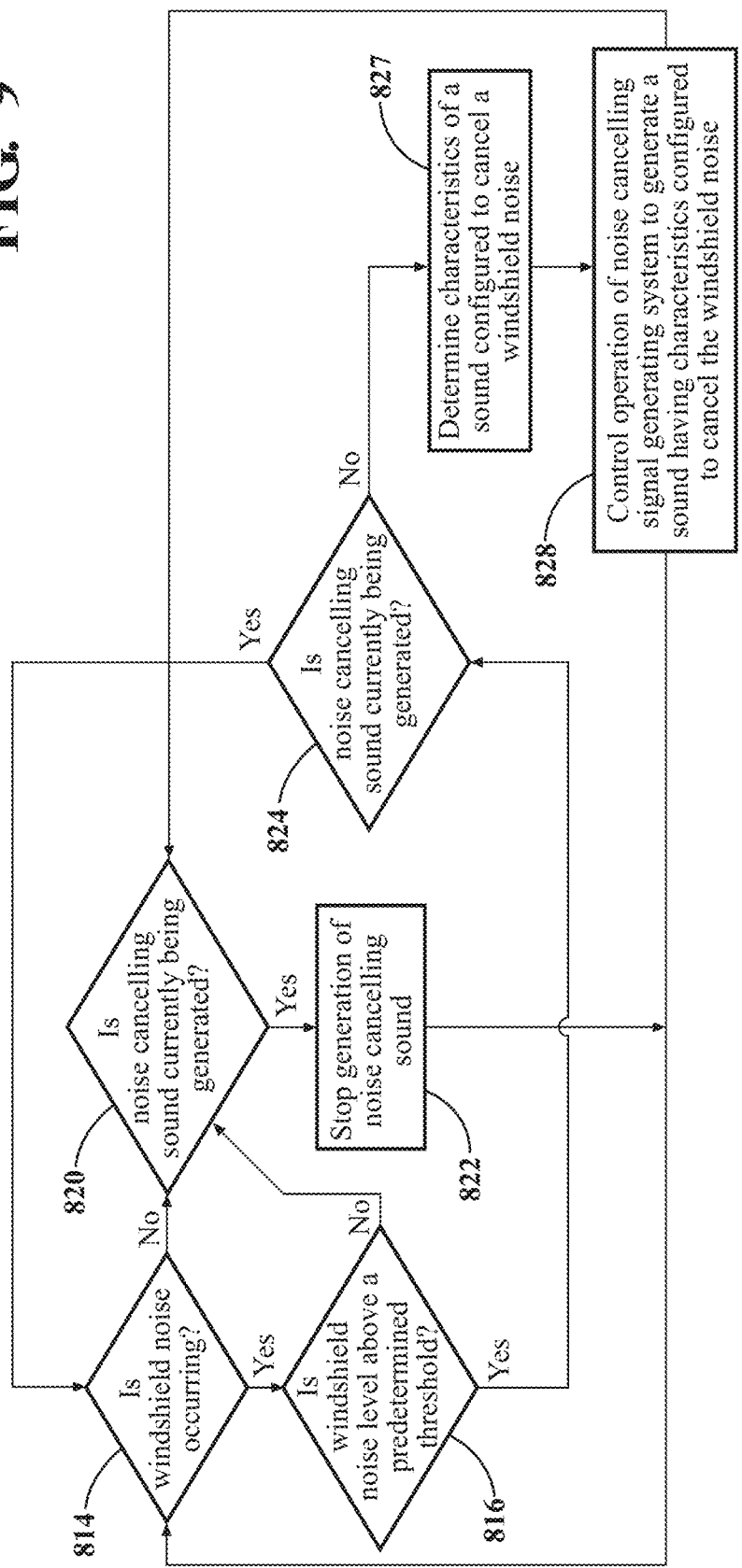

ACTIVE NOISE CONTROL FOR VEHICLE WINDSHIELD NOISE

CROSS REFERENCE TO RELATED APPLICATIONS

This application claims the benefit of U.S. Provisional Application No. 63/105,933, filed on Oct. 27, 2020, which is herein incorporated by reference in its entirety.

TECHNICAL FIELD

The subject matter described herein relates to active mitigation and/or cancellation of noise inside a vehicle occupant compartment and, more particularly, to active mitigation and/or cancellation of a noise which may be produced by vibration of a vehicle front windshield during operation of the vehicle.

BACKGROUND

Noise may be produced by vibration of a windshield during operation of a vehicle. Specifically, an airstream striking the windshield during vehicle movement and/or operation of vehicle systems such as the engine, A/C system, etc. may cause a steady-state vibration of a given windshield configuration at any of one or more particular frequencies (known as eigenfrequencies). Such vibrations may be especially grating or irritating to vehicle occupants. An active noise cancellation system may be controlled generate a sound configured to cancel a windshield. To maximize the comfort of vehicle occupants, it is important to identify and mitigate or eliminate windshield noise as soon as possible after it starts to be generated.

SUMMARY

In one aspect of the embodiments described herein, a system for actively mitigating noise caused by vibration of a thin vehicle front windshield in an occupant compartment of a vehicle is provided. The system includes a pair of laser scanners configured to be mountable inside the vehicle occupant compartment, each laser scanner being configurable to scan an associated initial portion of the windshield simultaneously with the other laser scanner, when the windshield is vibrating.

In another aspect, disclosed herein is a method of actively mitigating noise caused by vibration of a thin vehicle front windshield in an occupant compartment of a vehicle. The method may include steps of autonomously controlling each laser scanner of the pair of laser scanners to scan an associated initial portion of the windshield and, using laser scans of the initial portions of the windshield, determining a laser scanner of the pair of laser scanners that currently resides closest to a localized maximum displacement of the windshield. Operation of the determined laser scanner may be autonomously controlled to progressively scan the windshield in a movement direction away from the other laser scanner until a location of the localized maximum displacement is determined. Using data acquired from at least one laser scan of the windshield at the location of the localized maximum displacement, a frequency of the noise may be estimated. Using the estimated frequency of the noise, characteristics of a sound configured to cancel the noise may be determined. Operation of a noise cancelling signal generating system may then be controlled to generate the sound having characteristics configured to cancel the noise.

In another aspect of the embodiments described herein, a non-transitory computer readable medium is provided for actively mitigating noise caused by vibration of a thin vehicle front windshield in an occupant compartment of a vehicle. The computer readable medium stores instructions that when executed by processor(s) cause the processor(s) to autonomously control each laser scanner of a pair of laser scanners to scan an associated initial portion of the windshield. Further instructions cause the processor(s) to, using laser scans of the initial portions of the windshield, determine a laser scanner of the pair of laser scanners that currently resides closest to a localized maximum displacement of the windshield. Further instructions cause the processor(s) to autonomously control operation of the determined laser scanner to progressively scan the windshield in a movement direction away from the other laser scanner until a location of the localized maximum displacement is determined and, using data acquired from at least one laser scan of the windshield at the location of the localized maximum displacement, estimate a frequency of the windshield noise. Further instructions cause the processor(s) to, using the estimated frequency of the noise, determine characteristics of a sound configured to cancel the noise. Further instructions cause the processor(s) to control operation of a noise cancelling signal generating system to generate the sound having characteristics configured to cancel the noise.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 7 a flow diagram illustrating a process of performing initial laser scans of the windshield and determining which laser scanner is to conduct further scans to find the location of the localized maximum displacement.

FIG. 8 is a flow diagram illustrating a process of determining a location of the localized maximum displacement of the windshield.

FIG. 9 is a flow diagram illustrating operation of an embodiment of the active windshield noise mitigation system responsive to detection of a predetermined level of windshield noise in the occupant compartment.

DETAILED DESCRIPTION

Embodiments described herein relate to a system for actively mitigating noise caused by vibration of a thin vehicle front windshield in an occupant compartment of a vehicle. The system includes a pair of laser scanners configured to be mountable inside the vehicle occupant compartment. Each laser scanner is configurable to scan an associated initial portion of the windshield simultaneously with the other laser scanner when the windshield is vibrating. Scan data is analyzed to determine which scanner currently resides closer to a localized maximum displacement of the vibrating windshield. The scanner (the "determined scanner") residing closer to the localized maximum displacement is controlled to progressively scan additional portions of the windshield in a movement direction, until the localized maximum displacement is found. Laser scan data relating to the location of the localized maximum displacement is analyzed to determine characteristics of a sound configured to cancel the windshield noise. A noise canceling signal generating system is then controlled to generate a sound having the characteristics configured to cancel the windshield noise.

Figure 1:
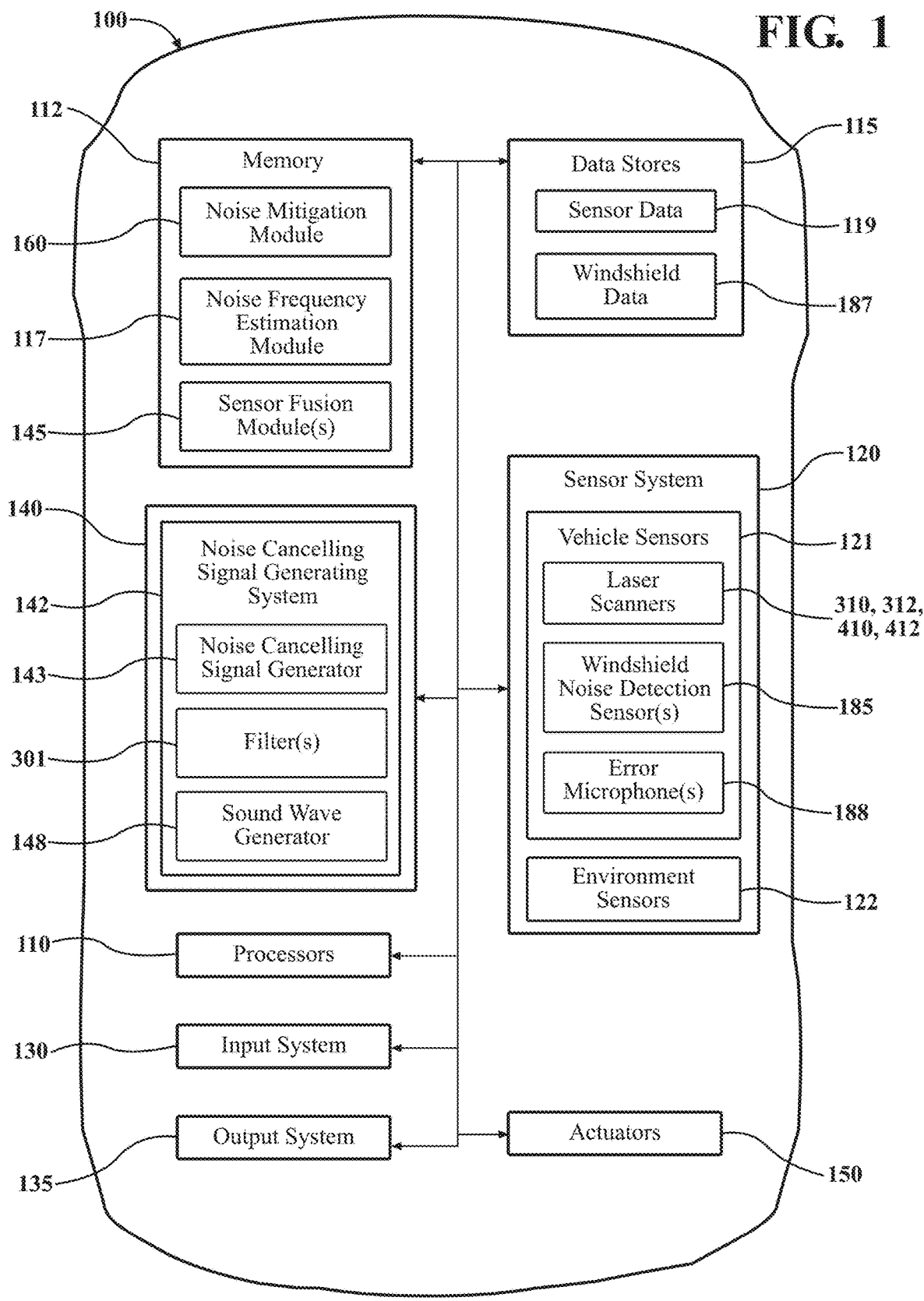
FIG. 1 is a block schematic diagram illustrating a vehicle incorporating a system for actively mitigating a windshield noise in an occupant compartment of a vehicle in accordance with embodiments described herein.

Referring to FIG. 1, an example of a vehicle 100 is illustrated. As used herein, a "vehicle" is any form of motorized transport. In one or more implementations, the vehicle 100 is conventionally-powered or hybrid passenger vehicle. While arrangements will be described herein with respect to passenger vehicles, it will be understood that embodiments are not limited to passenger vehicles. In some implementations, the vehicle 100 may be any form of motorized transport that benefits from the functionality discussed herein.

The vehicle 100 includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100.

Some of the possible elements of the vehicle 100 are shown in FIG. 1 and will be described with reference thereto. Additionally, it will be appreciated that for simplicity and clarity of illustration, where appropriate, reference numerals may have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

FIG. 1 shows a block schematic diagram of a vehicle 100 incorporating a system for actively mitigating a windshield noise in an occupant compartment 210 of a vehicle. As used herein, the term "windshield noise" refers to a noise generated by vibration of a vehicle front windshield. The vibration may be caused by operating components of the vehicle, such as the engine or A/C system (i.e., operation of the engine and/or other vehicle components may cause sympathetic or other vibration of the windshield, whether the vehicle is moving or stationary). In one or more arrangements, the windshield noise may be a noise caused by an airstream impinging on the windshield during forward movement of the vehicle. Alternatively, multiple factors may combine to cause the windshield to vibrate at a frequency which produces a noise in the occupant compartment which is irritating to vehicle occupants.

Referring to FIG. 1, the vehicle 100 can include one or more processors 110. In one or more arrangements, the processor(s) 110 can be a main processor(s) of the vehicle 100. For instance, the processor(s) 110 can be an electronic control unit (ECU). The vehicle 100 can include one or more data stores 115 for storing one or more types of data. The data store(s) 115 can include volatile and/or non-volatile memory. Examples of suitable data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operably connected to the processor(s) 110 for use thereby. The term "operably connected," as used throughout this description, can include direct or indirect connections, including connections without direct physical contact.

Responsive to forces acting on the windshield, any specific windshield configuration may tend toward steady-state vibration modes in any of several frequencies, known as eigenfrequencies. In steady state vibration at one of the windshield eigenfrequencies, each portion of the windshield may tend to remain at a certain distance from the plane P1, or the portion of the windshield may oscillate slightly about a point located at a certain distance from plane P1. The particular frequency values (e.g., 722 Hz) and the number of eigenfrequencies/vibration modes at which the windshield may vibrate may depend on a variety of factors, including windshield thickness, the method by which the windshield is mounted on the vehicle, and other factors. It has been found that the vibration modes or eigenfrequencies of a thin vehicle windshield may be particularly numerous and difficult to predict analytically. To maximize the comfort of vehicle occupants, it is important to identify the eigenfrequency at which the windshield is vibrating to produce noise, and to generate a sound configured to mitigate or eliminate the windshield noise as soon as possible. For purposes described herein, a "thin vehicle windshield" or "thin windshield" is a windshield having a thickness of 2 millimeters plus or minus a manufacturing tolerance.

The one or more data store(s) 115 can include windshield data 187. The windshield data 187 can include lookup tables, equations, and/or other functions and elements relating to a structure and mounting configuration of the vehicle windshield 212. Also, eigenfrequencies of a particular windshield configuration may be determined experimentally by accurately simulating windshield mounting conditions and forces which may act on the windshield during vehicle operation. Additional information, such as wavelengths, amplitudes, the speed of sound vibrations in the particular windshield (which may depend on windshield geometry and composition) and other characteristics (termed herein "calibration information") of the windshield and of noise signals produced by the windshield when vibrating at the various eigenfrequencies may also be determined by such experiments, analytically, or by the use of suitable reference sources. Pertinent calibration information may be associated with each eigenfrequency and stored in windshield data 187 of data stores 115 for use by the noise mitigation system in generating a sound having characteristics configured to cancel the windshield noise produced when the windshield is determined to be vibrating at the particular eigenfrequency.

The one or more data store(s) 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more laser scanners 310, 312, 410, 412 of the sensor system 120.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that an operator or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operably connected to the processor(s) 110, the data store(s) 115, and/or another element of the vehicle 100 (including any of the elements shown in FIG. 1). The sensor system can acquire data describing a state of the vehicle occupant compartment 210, such as the presence of windshield noise and other data described herein. The sensor system 120 can also acquire data of at least a portion of the external environment of the vehicle 100 (e.g., nearby objects).

The sensor system 120 can include any suitable type of sensor. Various examples of different types of sensors will be described herein. However, it will be understood that the embodiments are not limited to the particular sensors described. Various examples of sensors of the sensor system 120 are described herein. The example sensors may be part of the one or more environment sensors 122 and/or the one or more vehicle sensors 121. However, it will be understood that the embodiments are not limited to the particular sensors described. The sensor system 120 may include any sensors suitable for and/or required to perform any of the data acquisition and/or vehicle control operations contemplated herein.

Sensors of sensor system 120 may be communicably coupled to the various systems and components of the vehicle 100. The sensors may be operably connected to vehicle systems and components, such as data stores 115, processor(s) 110, and sensor fusion module(s) 145 for storage and processing of vehicle and environmental sensor data. Sensor system 120 may include sensors configured to detect and generate indications of the current state or status of vehicle systems and components.

The sensor system 120 can include one or more vehicle sensors 121. The vehicle sensor(s) 121 can detect, determine, and/or sense information about the vehicle 100 itself and/or any occupants and/or other objects inside the vehicle occupant compartment 210. The vehicle sensors 121 may include one or more windshield noise detection sensors 185. The windshield noise detection sensor(s) 185 may be positioned within the occupant compartment 210 and configured to detect and transmit sensor data indicative of a windshield noise. The sensor(s) 185 may be configured to forward all detected sounds to the noise frequency estimation module 117 for frequency discrimination/determination and further analysis.

The sensor(s) 185 may be any type of sensor that is capable of detecting sound or pressure changes within the vehicle occupant compartment 210. In one or more arrangements, the one or more sensors 185 are pressure transducers or microphones capable of detecting sound waves within the occupant compartment. In alternate embodiments, the sensor(s) are a combination of different types of sensors positioned within the occupant compartment. The position(s) of the sensor(s) 185 in the occupant compartment may vary depending upon the type of sensor being used. However, it is desirable to position the sensor(s) 185 at location(s) that will allow for quick and early detection of the windshield noise in the occupant compartment 210.

In addition, the sensor system 120 can include one or more environment sensors 122 configured to acquire, and/or sense driving environment data. "Driving environment data" includes data or information about the external environment in which the vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. As examples, in one or more arrangements, the environment sensors 122 can include one or more radar sensors, one or more LIDAR sensors, one or more sonar sensors, and/or one or more cameras (not shown).

Figure 2A:
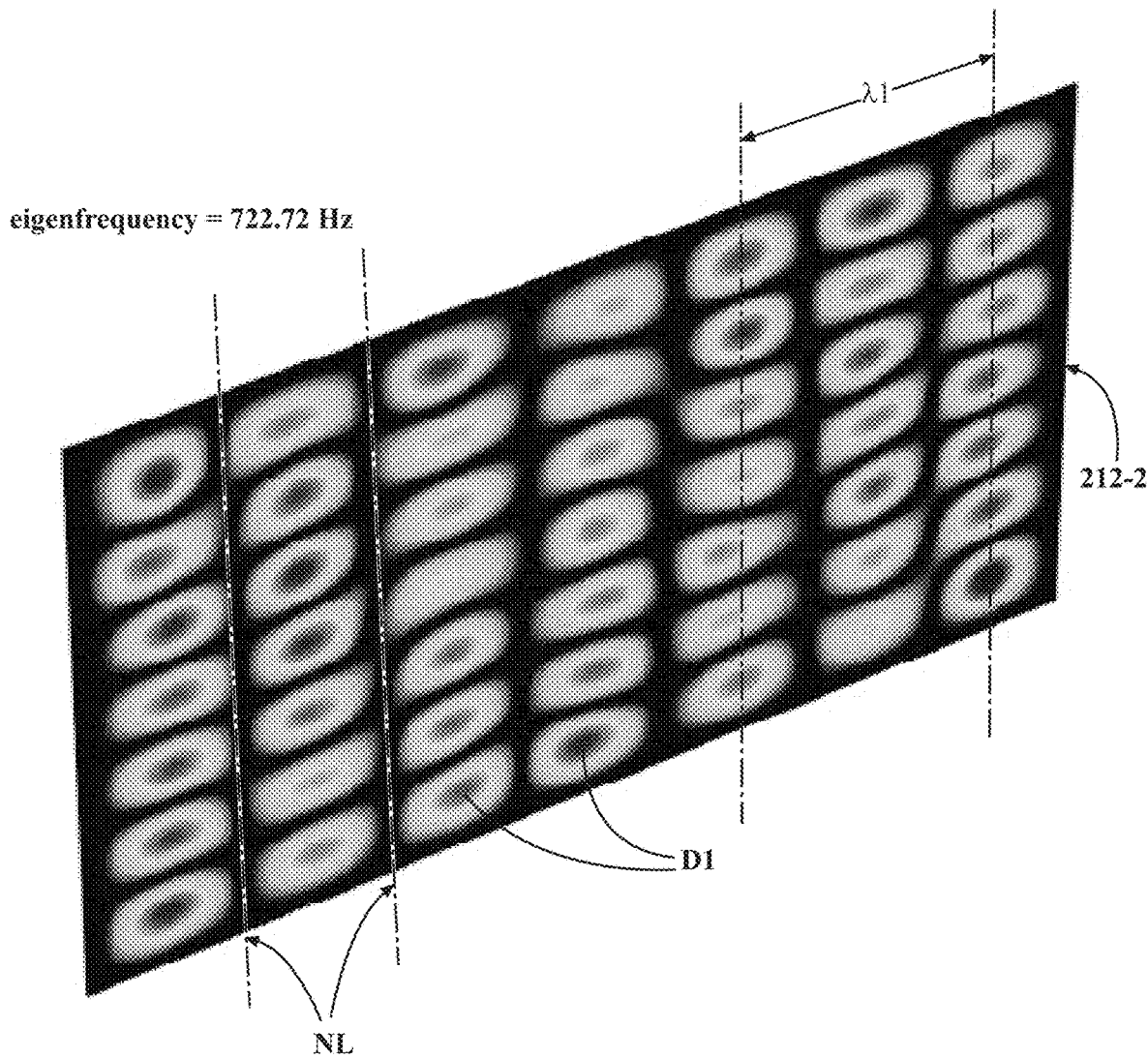
FIG. 2A is a schematic perspective view of a vehicle windshield vibrating at one of its eigenfrequencies.
Figure 2B:
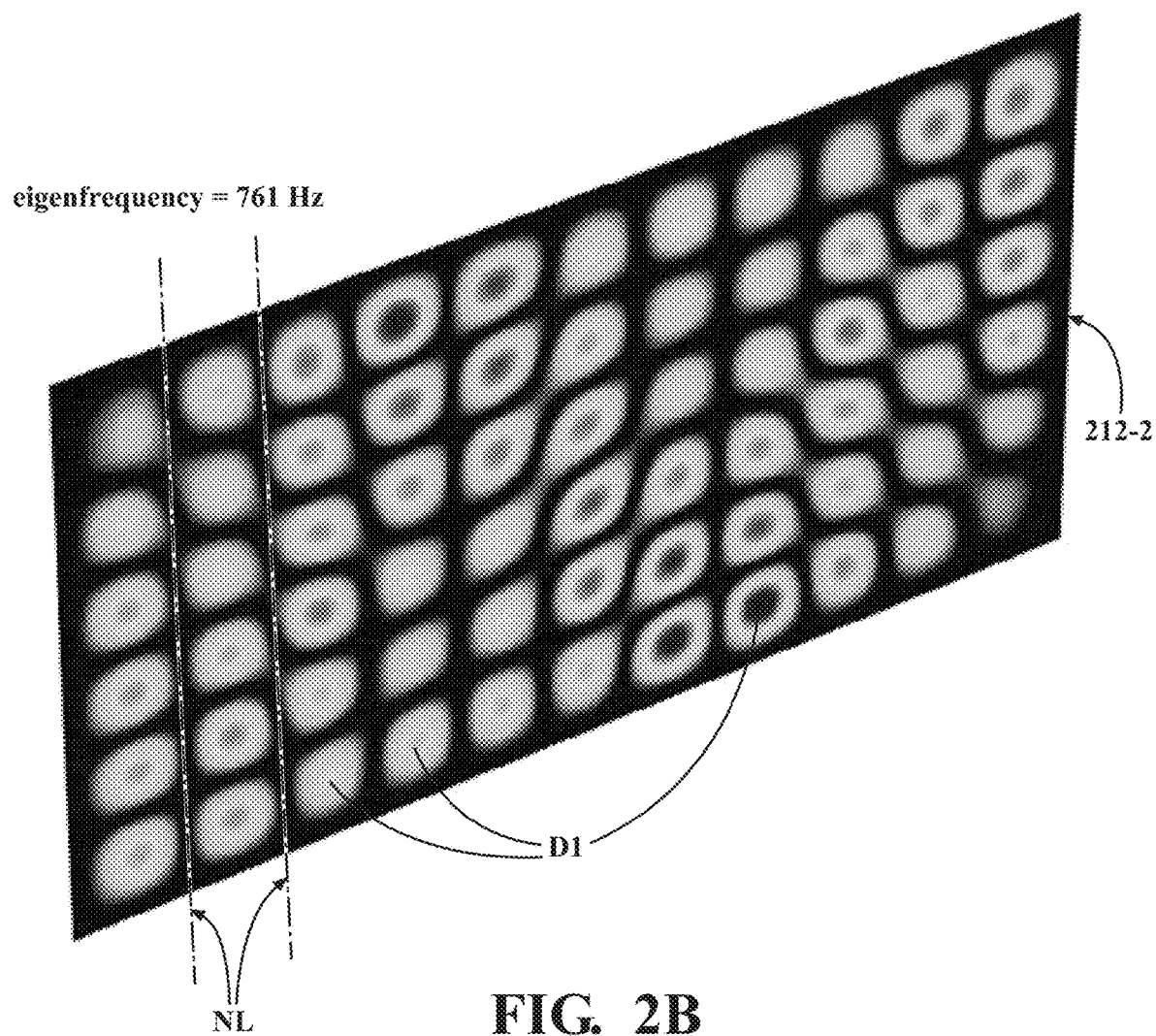
FIG. 2B is a schematic perspective view of a vehicle windshield vibrating at another one of its eigenfrequencies.

Referring to FIGS. 2A and 2B, the vehicle 100 may have an occupant compartment 210. The occupant compartment 210 may comprise an enclosure inside the vehicle 100 where living vehicle occupants (i.e., people and pets) reside while the vehicle is moving. The occupant compartment may also be used for transporting packages (e.g., groceries) and other objects. Noise generated by the windshield 212 may be transmitted into the occupant compartment.

FIGS. 2A-2B are schematic perspective views of a thin vehicle windshield 212 vibrating in two of its vibration modes (i.e., at two different eigenfrequencies). For example, FIG. 2A shows a windshield having a thickness of 2 mm vibrating in a first vibration mode in which an eigenfrequency of the windshield is determined to be 722.72 Hz. FIG. 2B shows the same windshield vibrating in a second vibration mode in which an eigenfrequency of the windshield is determined to be 761 Hz. FIGS. 2A-2B show spaced-apart, localized regions of maximum displacement D1 alternating with regions of zero displacement (along nodal lines NL) for each eigenfrequency when the windshield is vibrating at steady state. As seen from FIGS. 2A-2B, the numbers and arrangements of the nodal lines NL and the windshield localized maximum displacements D1 may differ for each of the eigenfrequencies.

Figure 3A:
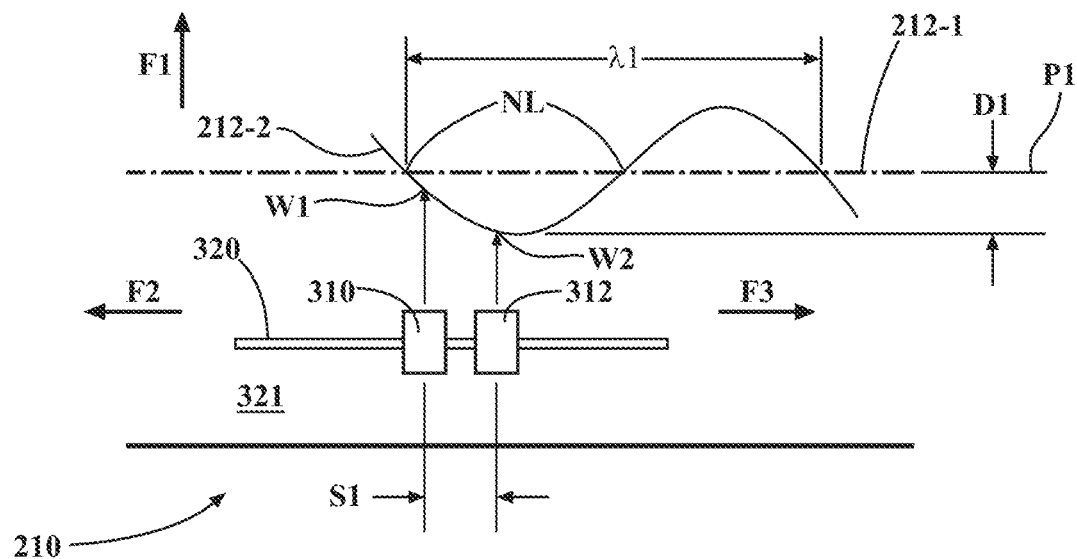
FIG. 3A is a schematic plan view of a portion of the vehicle occupant compartment near the vehicle front windshield, showing one embodiment of an arrangement of laser scanners usable for determining a localized maximum displacement of the windshield due to vibration.
Figure 3B:
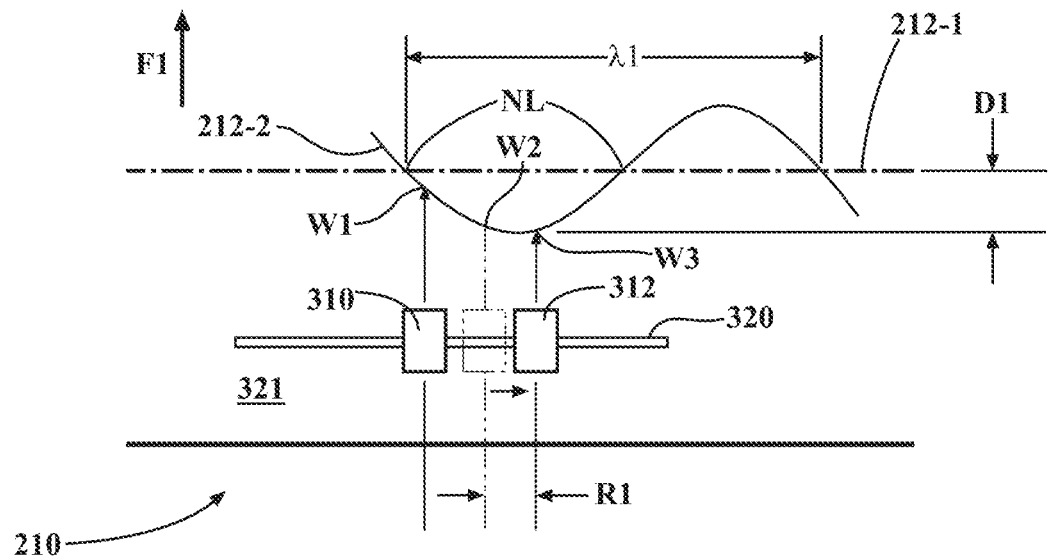
FIG. 3B is the view of FIG. 3A illustrating a process of scanning incrementally successive portions of the windshield to locate the localized maximum displacement of the windshield.

FIGS. 3A-3B are schematic plan views of portions of the vehicle occupant compartment 210 showing one embodiment of an arrangement of laser scanners 310, 312 mounted on a vehicle dashboard 321 spaced apart from front windshield 212. FIGS. 3A-3B also show schematic representations of edge or cross-sectional views of a portion of the windshield 212 at rest (212-1) and during vibration in a steady-state vibration mode. Referring to FIGS. 2A-2B and 3A-3B, a magnified cross-section through the windshield 212-2 in a steady-state vibration mode of the windshield may have a sinusoidal shape with localized maximum displacements D1 alternating in direction as shown with respect to a neutral axis of the windshield, as represented by 212-2. Referring to FIG. 3A, a displacement of a portion of the windshield may be measured in a direction from the plane P1 toward a laser scanner (i.e., toward or further into the occupant compartment). A localized maximum displacement of the windshield may be a greatest distance D1 of a localized portion of the windshield from the plane P1 in the "at rest" condition of the windshield, when the windshield is vibrating at one of its eigenfrequencies.

Figure 4A:
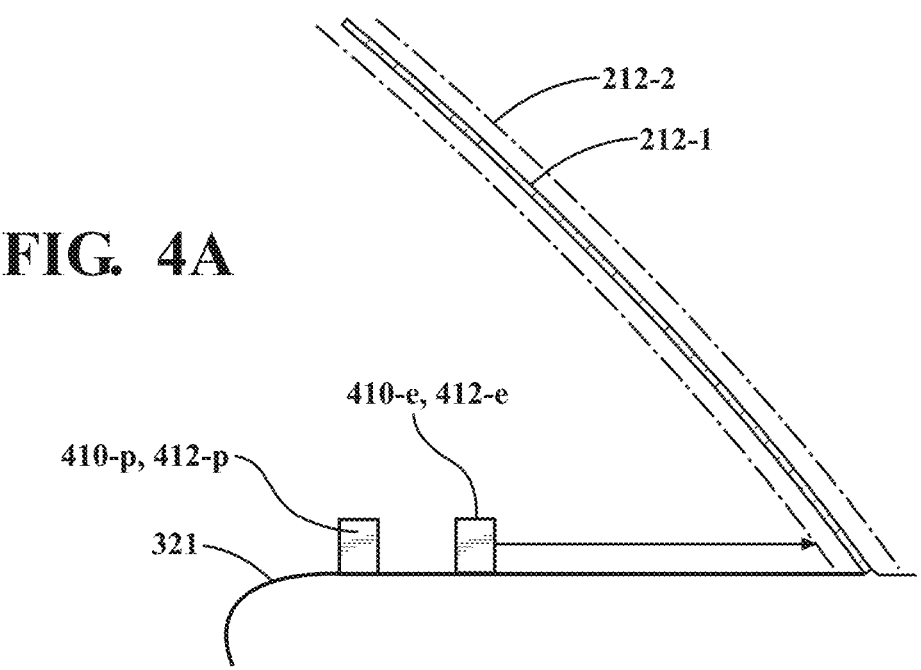
FIG. 4A is a schematic side view of a portion of the vehicle occupant compartment near the vehicle front windshield, showing another embodiment of an arrangement of laser scanners usable for determining a location of the localized maximum displacement of the windshield due to vibration.
Figure 4B:
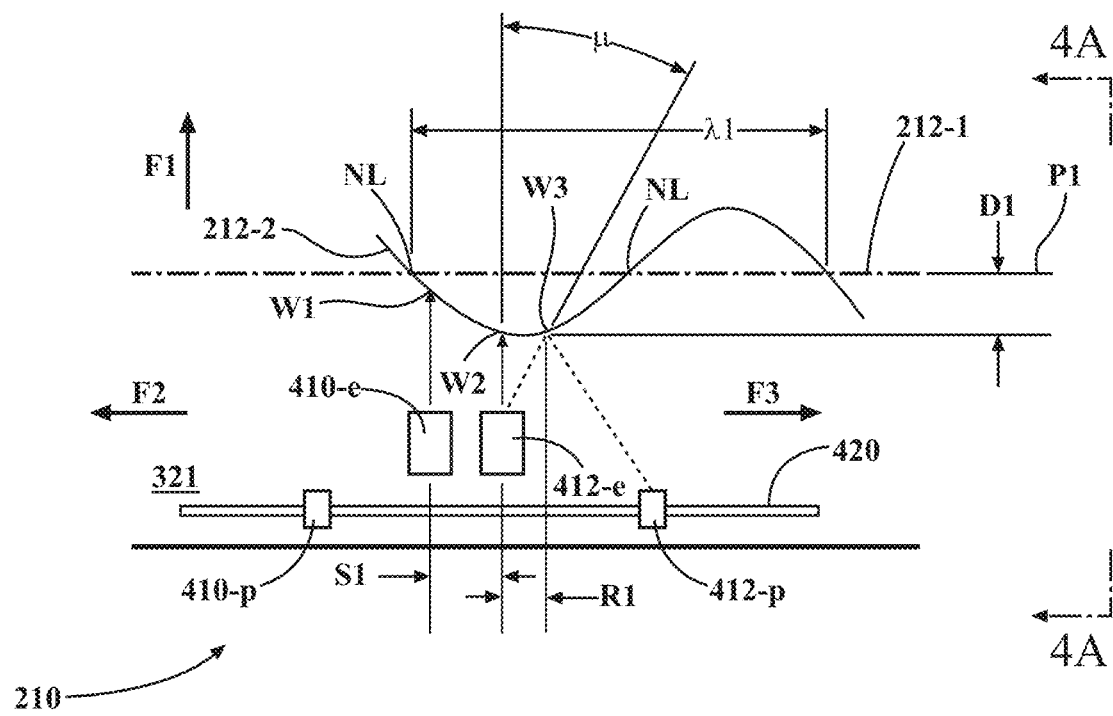
FIG. 4B is a schematic plan view of the portion of the vehicle shown in FIG. 4A illustrating another process of incrementally scanning successive portions of the windshield to locate the localized maximum displacement of the windshield.

FIG. 4A is a schematic side view of a portion of the vehicle occupant compartment near the vehicle front windshield, showing another embodiment of an arrangement of laser scanners 410, 412 usable for determining a location of the localized maximum displacement of the windshield due to vibration. FIG. 4B is a schematic plan view of the portion of the vehicle shown in FIG. 4A illustrating another process for incrementally scanning successive portions of the windshield to locate the localized maximum displacement of the windshield. Laser scanners 410, 412 mounted on the vehicle dashboard 321 behind the windshield 212. In FIGS. 3A-3B and 4A-4B, both the unexcited or "at-rest" state of the windshield (as 212-1) and a vibrating state (as 212-2) of the windshield 212 are shown. As seen in FIGS. 2A-2B, FIGS. 3A-3B, and FIGS. 4A-4B, when the windshield 212 is in one of its vibration modes, portions of the inner surfaces of the windshield may tend to oscillate and displace to various distances from the plane P1 defining the inner surface of the windshield 212 in an unexcited or "at-rest" state. The drawings also show showing one or more nodal lines NL and localized maximum displacements D1 of the vibrating windshield 212-2. The windshield 212-2 is shown vibrating at one of its eigenfrequencies. Magnitudes of the localized maximum displacements D1 of the portions of the vibrating windshield 212-2 have been exaggerated in the drawings for purposes of description.

Embodiments of the active windshield noise mitigation system described herein utilize a pair of laser scanners mounted inside the vehicle occupant compartment 210. As used herein, the term "laser scanner" refers to at least a laser emitter and an associated laser photodetector or receiver configured to receive laser light from the emitter which is reflected by a surface (for example, a surface of a vehicle front windshield) at which the emitter is aimed. A laser photodetector may be positioned in a common housing with an associated emitter to form a unitary or single laser scanner, or otherwise so as to maintain the emitter and photodetector in a fixed spatial relationship with each other. Alternatively, the positions of the emitter and/or photodetector may be adjustable with respect to each other, to permit light from the emitter to be redirected and the photodetector position adjusted to receive reflected light that was emitted in the new direction. In addition, controlling operation of a laser scanner may involve such operations as translating and/or rotating an emitter and/or an associated photodetector, changing (by manipulation of mirrors or other beam guidance mechanisms) the direction or "steering angle" of a laser light emitted from the emitter and/or implementing any other actions or functions which facilitate and/or enable performance of the data acquisition operations described herein.

Each laser scanner may be configurable to scan an associated portion of the windshield 212 simultaneously with the other laser scanner when the windshield 212 is vibrating. When the windshield 212 is vibrating in one of its eigenfrequencies, the scanners may scan associated portions of the windshield to determine a displacement of each scanned portion of the windshield 212. Based on these displacements, the active windshield noise mitigation system may determine a direction in which further scans are to be performed in order to locate a localized maximum displacement D1 of the windshield 212 as rapidly as possible. At least one of the laser scanners may then be controlled to perform further scans of the windshield in the determined direction until the localized maximum displacement is found.

The laser scan rates should be tailored with respect to the range of windshield eigenfrequencies so as to enable detection of the displacements of the portions of the windshield being scanned. If desired or needed to acquire the necessary data, multiple scans of a single location may be performed before moving to the next scan location. The laser sensors may be configured to record time-domain displacement values (i.e., displacement values according to the sinusoidal function with respect to time) or velocity values. Either displacement data or velocity data may be processed to determine the windshield vibration frequency. In the embodiments described herein, displacement data may be acquired and processed.

Referring to FIGS. 3A-3B, in one or more arrangements, each of the laser scanners 310, 312 may be movably mounted on a horizontal track 320 extending laterally with respect to the vehicle (i.e., along an axis extending perpendicular to a plane including a fore-aft axis of the vehicle). Each scanner may be structured to be independently movable along the track 320 under control of the noise frequency estimation module 117 as described herein. For example, each scanner may have a motor and associated driven gear coupled thereto to enable movement of the scanner along a rack gear extending along the track. Any of a variety of other scanner motion mechanisms is also possible. In one or more arrangements, the track is mounted on the vehicle dashboard 321 spaced apart from the inner surfaces (plane P1) of the windshield 212. The scanners 310, 312 may be mounted so as to face the windshield 212, in a forward direction F1 of the vehicle 100. The arrangement described enables both of scanners 310, 312 to be autonomously moved simultaneously, or either scanner may be moved with respect to the other scanner while the other scanner remains stationary. This arrangement also enables an initial spacing S1 between the emitters of the scanners to be autonomously adjusted prior to scanning as described herein.

Referring to FIGS. 4A-4B, in other arrangements, the laser scanner emitters 410-*e*, 412-*e* may be spaced apart a distance S1 as previously described and statically mounted to the dashboard or another suitable part of the vehicle. Beams or pulses from the emitters 410-*e*, 412-*e* may be guided or "steered" for scanning various portions of the windshield using autonomously controllable mirrors and/or other steering or beam guidance mechanisms. Each of the emitters 410-*e*, 412-*e* and their associated beam guidance mechanisms may be independently controllable to steer their respective beams/pulses. The mirror(s) may be operably coupled to one or more associated autonomously controllable motors or other mechanisms configured for controlling the orientations of the mirror(s) with respect to a laser beam/pulse emitted by the emitter.

In addition, one or more photodetectors or receivers 410-*p*, 412-*p* for detecting light reflected from the windshield may be mounted to the vehicle so as to be autonomously individually movable along one or more tracks 420, as previously described. In particular arrangements, a separate photodetector is configured to be independently autonomously movable and controllable to receive reflected light from an associated one of the emitters 410-*e*, 412-*e*. In the embodiment shown, photodetector 410-*p* is movable along track 420 to receive reflected light from associated emitter 410-*e*, and photodetector 412-*p* is movable along track 420 to receive reflected light from associated emitter 412-*e*. A light-receiving position of each of photodetectors 410-*p*, 412-*p* may be autonomously adjusted according to the adjusted steering angle μ of the laser beam/pulse to be emitted from the emitter associated with the photodetector. The steering angle μ may be an angle formed between a plane extending in the direction F1 and a desired angle of the laser beam/pulse. In other arrangements, reflected light originating from both emitters may be received by a single photodetector (not shown) which may be stationary or configured to be autonomously controllable and movable along the track. In particular arrangements, to aid a photodetector in distinguishing between the laser beams/pulses, the beams/pulses may have different wavelengths. Operation of the emitters, photodetectors, and light steering mechanisms may be controlled by the noise frequency estimation module 117 as described herein.

Referring again to FIG. 3A, an initial spacing S1 between emitters of the laser scanners 310, 312 may be a horizontal spacing between the emitters prior to detection of a windshield noise sufficient to warrant the generation of a noise-cancelling sound by the noise mitigation module. The initial spacing S1 may be a horizontal distance between centerlines of the emitters, thereby corresponding to a horizontal distance between centerlines of laser beams or pulses that would be emitted by the emitters. The initial spacing S1 may be optimized for detecting a localized maximum displacement D1 of the windshield as soon as possible after windshield noise is detected. In one or more arrangements described herein, an initial spacing S1 of the laser scanner emitters may be determined as a function of a predetermined wavelength λ1 for a value of a predetermined frequency f1 (assumed to be one of the windshield eigenfrequencies) and a speed V1 of vibration waves in the windshield glass.

A speed V1 of the vibration waves in the windshield medium may be given by the relationship:

$$V1 = \sqrt[4]{\frac{D(2\pi f1)^2}{\rho h}} \quad (1)$$

where D=a flexural rigidity of the glass, h=glass thickness, and ρ=the density of the glass. The value of the parameter D may be determined using the relationship:

$$D = \frac{Eh^3}{12(1-v^2)} \quad (2)$$

where E is the elastic modulus of the glass material and v is Poisson's ratio for the glass material. Typical material properties for a glass used in the application described herein may be E=73.1 GPa, v=0.17, and ρ=2203 kg/m³.

A relationship between the wavelength λ1 of a sound vibration in the glass and the frequency f1 of the vibration is given by:

$$\lambda 1 = \sqrt[4]{\frac{D}{\rho h} \frac{(2\pi)^2}{f1^2}} \quad (3)$$

In one example, using the above relationships, for glass having a thickness of 2 mm and where D=48 and f1=700 Hz, V1=120 meters/sec. and λ1=172 millimeters.

As shown in FIG. 3A, the wavelength λ1 may be a distance between consecutive corresponding points (such as crests, troughs, or nodal lines) of the same phase on the wave. Thus, in one or more arrangements, the wavelength λ1 may be taken as the distance between two successive or adjacent local maximum displacements D1 located along a common horizontal axis and along a same side of the windshield (i.e., either inside the occupant compartment or outside the occupant compartment). In particular arrangements, the laser scanners 310, 312 are configured so that an initial spacing between laser pulses emitted by associated emitters of the laser scanners is in the range of 0.2-0.3 times the predetermined wavelength. In more particular arrangements, the initial spacing S1 may be determined by the relationship:

$$S1 = 0.2 \times \lambda 1 \quad (4)$$

In particular arrangements, the predetermined wavelength λ1 may be a wavelength corresponding to a highest eigenfrequency of the windshield 212 which may be experienced by the windshield during operation of the vehicle. This highest eigenfrequency may be determined by windshield configuration testing and stored in windshield data 187. This arrangement may provide relatively high system resolution for detecting differences between maximum displacements of portions of the windshield when the laser scanners are initially activated upon detection of the windshield noise. For example, using the value for λ1=172 mm, the initial spacing S1 would be 0.2×172=34.4 mm.

The vehicle 100 can include an input system 130. An "input system" includes any device, component, system, element or arrangement or groups thereof that enable information/data to be entered into a machine. For example, the input system 130 may include a keypad, a touch screen or other interactive display, a voice-recognition system and/or any other device or system which facilitates communications between an operator and the vehicle 100. The input system 130 can receive an input from a vehicle occupant (e.g., a driver or a passenger) or an operator located remotely from the vehicle 100.

The vehicle 100 can also include an output system 135. An "output system" includes any device, component, or arrangement or groups thereof that enable information/data to be presented to a vehicle occupant (e.g., a driver, a vehicle passenger, etc.) or a remote operator.

The vehicle 100 can include one or more actuators 150. The actuators 150 can be any element or combination of elements operable to modify, adjust and/or alter one or more of the vehicle systems or components thereof to responsive to receiving signals or other inputs from the processor(s) 110 and/or the noise mitigation module 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more vehicle systems, collectively designated 140. Various examples of the one or more vehicle systems 140 can include a propulsion system, a braking system, a steering system, throttle system, a suspension system, a transmission system, a climate control system, and/or a navigation system, none of which are shown in FIG. 1. FIG. 1 shows a noise canceling signal generating system 142 included in the vehicle systems 140. Each of these systems can include one or more devices, components, and/or a combination thereof, now known or later developed. It should be appreciated that each or any of the vehicle systems or portions thereof may be combined or segregated via hardware and/or software within the vehicle 100.

The vehicle systems 140 can include the noise cancelling signal generating system 142. The noise cancelling signal generating system 142 may be operable to generate a sound configured to cancel a windshield noise inside the occupant compartment. The noise cancelling signal generating system 142 can include any elements and/or subsystems (in the form of hardware and/or software) which facilitate or enable performance of the noise cancelling signal determination and/or generation functions described herein. The windshield noise frequency f1 and other characteristics of the windshield noise may be used to determine characteristics of a sound configured to cancel the windshield noise inside the occupant compartment. For example, the noise cancelling sound determined using frequency f1 may be generated and output as an active noise canceling output by a sub-woofer or other speaker. In one or more arrangements, the canceling sound may have the frequency f1 and be equal in amplitude but opposite in phase to the buffeting noise.

The noise cancelling signal generating system 142 may include a noise canceling signal generator 143. The signal generator 143 may be configured to generate a signal for controlling operation of a sub-woofer, speaker, or other type of sound wave generator 148 to produce a sound having characteristics configured to cancel or mitigate a windshield noise generated inside the occupant compartment 210. The signal generator may be configured to generate the control signal using the windshield noise frequency f1 and/or other sensor data, including data from windshield noise detection microphones 185 and error microphones 188 (FIG. 5).

The noise cancelling signal generating system 142 may include one or more sound wave generators 148. In one or more arrangements, the one or more sound wave generator(s) 148 may be in the form of sub-woofers or other speakers. Sound wave generator(s) 148 may be configured to generate a noise canceling sound responsive to a control signal received from the signal generator 143 (i.e., the sound wave generator(s) 148 may convert the control signal into a sound having characteristics configured to cancel a windshield noise). In one or more arrangements, sound wave generator(s) 148 in the form of sub-woofers or other speakers may be standard production components of a vehicle stereo system which may be operated to produce the noise-canceling signal under conditions described herein.

While the sound wave generators 148 may be described herein in the form of sub-woofers of other types of speakers, the signal generating system 142 may incorporate any type of sound wave generator capable of generating sound waves having the characteristics required of the canceling signal. Suitable sound wave generators include but are not limited to automobile speakers and/or subwoofers, piezoelectric sound generators or piezoelectric speakers and air pressure generators. In one or more arrangements, as described herein, the noise cancelling signal generating system 142 may be controllable by a noise mitigation module 160 (described in greater detail below) to generate a noise canceling signal if a windshield noise is detected by windshield noise detection sensors 185 as actually occurring in the occupant compartment and the windshield noise is at a level above a predetermined threshold. Characteristics of the noise-canceling sound to be generated by the signal generating system 142 may be determined by the noise mitigation module 160 responsive to sensor data as described herein. In one or more arrangements, the noise cancelling signal may be equal in amplitude but opposite in phase from the windshield noise.

Figure 5:
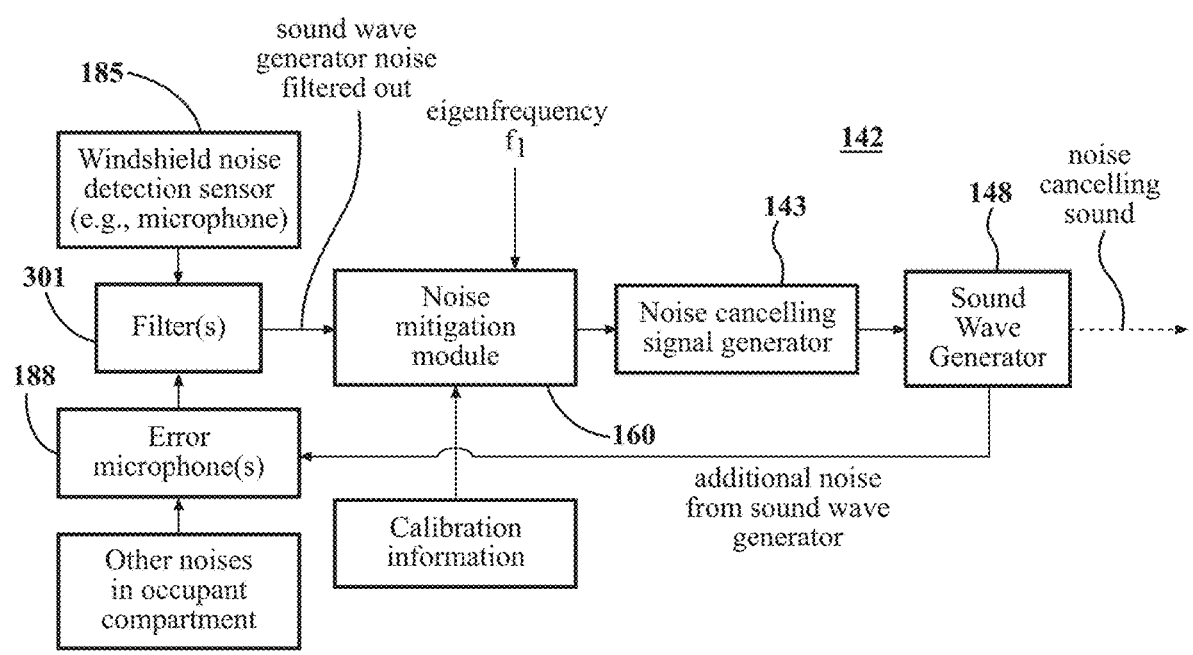
FIG. 5 is a block schematic diagram illustrating operation of a noise canceling signal generating system in accordance with an embodiment described herein.

FIG. 5 illustrates operation of an aspect of one or more particular arrangements of the noise cancelling signal generating system 142 in which the vehicle sensors 121 include at least one windshield noise detection sensor(s) 185 in the form of at least one microphone configured to detect when a windshield noise is occurring, and at least one error microphone 188 configured to detect noise generated by a subwoofer/speaker or other sound wave generator 148 used to generate the noise canceling sound. The noise cancelling signal generating system 142 may be operable as described herein under direction of the noise mitigation module 160 or under direction of a dedicated signal generating system controller (not shown) controlled by the noise mitigation module 160.

Referring to FIG. 5, a windshield noise detection sensor(s) 185 in the form of at least one microphone may detect the occurrence of a windshield noise. The windshield noise may be passed to one or more filters 301 as a reference signal to aid the filter(s) in distinguishing the windshield noise from additional noise produced by the sound wave generator 148 when generating the canceling sound. The error microphones 188 may also detect the additional noise from the noise cancelling sound output by the sound wave generator 148 and other noise present in the occupant compartment 210. These additional noises may be forwarded to the filter(s) 301.

The filtered signal (with the sound wave generator noise removed or attenuated) may be passed to the noise mitigation module 160. Then, using the estimated windshield eigenfrequency f1 and windshield configuration calibration information stored in windshield data 187, the noise mitigation module 160 may determine characteristics of a sound configured to cancel the windshield noise inside the occupant compartment 210 due to vibration of the windshield.

The noise mitigation module 160 may then control operation of the noise cancelling signal generator 143 to generate a signal configured for controlling the sound wave generator 148 to generate the sound having characteristics for canceling the windshield noise inside the occupant compartment 210. Additional, extraneous sound generated by the sound wave generator 148 and also other occupant compartment noise may also be picked up by the error microphones 188 and fed into the filter(s) 301 as previously described, to enable this sound to be distinguished and filtered out of the windshield sound detected by sensor(s) 185. In this manner, the control loop shown in FIG. 3 provides active feedback to optimize the active noise control and allows the subwoofer/speaker to emit an active noise canceling sound of equal in amplitude but opposite in phase to the windshield noise.

Referring again to FIG. 1, the vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more of data store(s) 115 may contain such instructions.

Generally, a module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Figure 6:
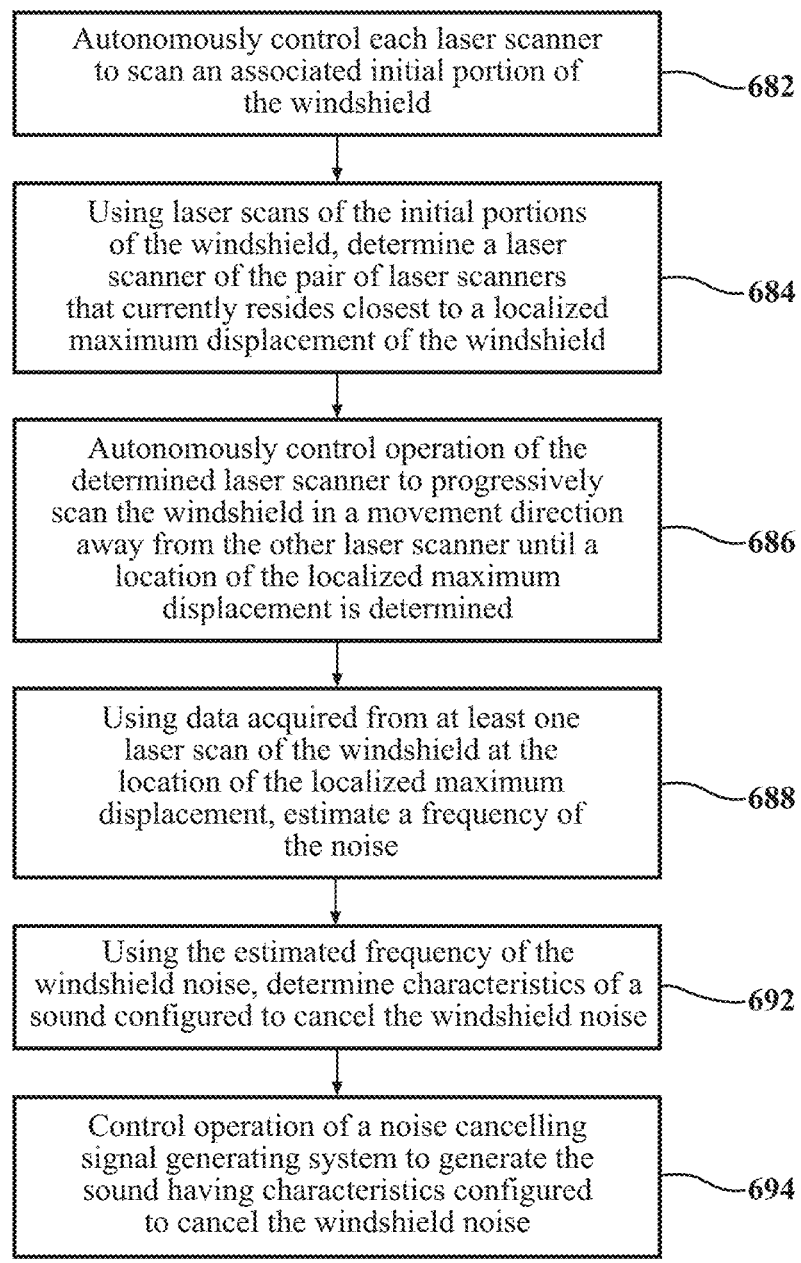
FIG. 6 is a flow diagram illustrating the basic operations of a system for actively mitigating a windshield noise in an occupant compartment of a vehicle in accordance with an embodiment described herein.

FIG. 6 is a flow diagram illustrating the basic operations of a system for actively mitigating a windshield noise in an occupant compartment of a vehicle in accordance with an embodiment described herein. In one or more arrangements, the windshield noise mitigation system may be configured to operate as described herein whenever the vehicle engine is running, whether or not the vehicle is moving. General functions and operations of the noise frequency estimation module 117 and the noise mitigation module 160 may be described with reference to FIGS. 1 and 6.

Referring to FIGS. 1 and 6, the vehicle 100 can include a noise frequency estimation module 117. The noise frequency estimation module 117 may include computer-readable instructions that when executed by the processor(s) 110 cause the processor(s) to (block 682) autonomously control each laser scanner of the pair of laser scanners to scan an associated initial portion of the windshield. The noise frequency estimation module 117 may be configured to (in block 684), using laser scans of the initial portions of the windshield, determine a laser scanner of the pair of laser scanners that currently resides closest to a localized maximum displacement of the windshield.

The noise frequency estimation module 117 may be configured to (in block 686) autonomously control operation of the determined laser scanner to progressively scan the windshield in a movement direction away from the other laser scanner until a location of the localized maximum displacement is determined. "Progressively scanning" the windshield refers to incrementally scanning portions of the windshield other than the initially scanned portions of the windshield, in the movement direction. The laser scanner is controlled to increment a target area of the laser so that the portion of the windshield to be scanned is moved or re-targeted a predetermined horizontal distance from the location of the latest scan. A scan is then performed on the new portion of the windshield. This process may be continued, with the laser target area repeatedly incremented in the movement direction until the localized maximum displacement of the windshield is found.

The noise frequency estimation module 117 may be configured to (in block 688), after the localized maximum displacement has been located, use data acquired from at least one laser scan of the windshield at the location of the localized maximum displacement to estimate a frequency of the noise. The acquired data may have been obtained from a previous scan, or the determined laser scanner may be controlled to scan the windshield at the location of the localized maximum displacement to acquire additional sensor data usable for estimating a frequency f1 of the noise. Acquiring sensor data at the localized maximum displacement enables the vibration amplitude to be determined. This amplitude may be correlated with other noise parameters so that the noise generated by the vibrating windshield may be accurately characterized.

Referring again to FIGS. 1 and 6, the vehicle 100 can include a noise mitigation module 160. In one or more arrangements, the noise mitigation module 160 may include computer-readable instructions that when executed by the processor(s) 110 cause the processor(s) to (block 692), using an estimated frequency of the windshield noise and calibration information (if needed) relating to the windshield configuration and/or behavior of the windshield at the determined eigenfrequency, determine characteristics of a sound configured to cancel the noise. The noise mitigation module 160 may also be configured to (block 694) control operation of the noise cancelling signal generating system 142 to generate the sound having characteristics configured to cancel the noise.

In one or more arrangements, the noise mitigation module 160 may include computer-readable instructions that when executed by the processor(s) 110 cause the processor(s) to control operation of the signal generating system 142 to generate a noise-cancelling sound when a windshield noise level detected within the occupant compartment 210 is above a predetermined threshold. The noise mitigation module 160 may also include computer-readable instructions that when executed by the processor(s) cause the processor(s) to control operation of the signal generating system 142 to stop generation of the noise-cancelling sound if the windshield noise level falls below the predetermined threshold. In one or more particular arrangements, the predetermined sound level threshold is 50 dB.

Referring again to FIG. 1, the vehicle 100 can include a sensor fusion module 145. The sensor fusion module may store one or more sensor fusion algorithms (or may incorporate or be in communication with a computing device storing an algorithm) configured to accept data from the sensor system 120 as an input. The data may include, for example, data representing information sensed at the sensors of the sensor system 120. The sensor fusion algorithm may include or be configured to be executed using, for instance, a Kalman filter, Bayesian network, or other algorithm. The sensor fusion algorithm may provide various assessments based on the data from sensor system 120. The assessments may include estimations of the frequencies and/or other characteristics of windshield noise, relative positions and/or steering angles of laser scanners, locations of localized maximum displacements on the windshield with respect to a common reference, and other assessments based on sensor data.

FIG. 7 shows operation of an embodiment of the noise frequency estimation module 117 to determine which laser scanner of the pair of laser scanners is closest to a localized maximum displacement of the windshield, thereby determining a movement direction in which the windshield will be further scanned to locate the localized maximum displacement. A localized maximum displacement D1 of the windshield 212-2 closest to one of the laser scanners may be determined by incrementally moving a scanning field of a laser scanner along a surface of the windshield and using the scan data to determine the displacements of the scanned portions of the windshield while the windshield is in one of its vibration modes. A time-of-flight of light (from emitter to receiver) reflected off a portion of the windshield at local maximum displacement may be less than the times-of-flight of light reflected from other portions of the windshield to either side of the portion at maximum displacement.

Referring to FIGS. 3A and 7, an initial spacing S1 between emitters of the laser scanners 310, 312 may be determined as previously described and autonomously implemented for the particular windshield configuration by individually controlling the positioning of one or more of the laser scanners. In blocks 610 and 630, each laser scanner may be controlled to scan an associated initial portion of the windshield. More specifically, the noise frequency estimation module 117 may control operation of a first laser scanner 310 to scan an associated first portion W1 of the windshield 212-2. For example, referring to FIG. 3A, the first portion W1 of the windshield scanned by the first laser scanner 310 may reside directly in front of the first laser scanner when the scanner is oriented so as to scan in the direction F1 toward the front of the vehicle. Simultaneously, the noise frequency estimation module 117 may control operation of the second laser scanner 312 to scan a second, different portion W2 of the windshield. Thus, as seen in FIG. 3A, the portion W2 of the windshield scanned by the second laser scanner 312 may reside directly in front of the second laser scanner when the scanner is oriented so as to scan in the direction toward the front of the vehicle. Due to the initial spacing S1 between the laser scanner emitters in relation to the wavelength of the highest windshield eigenfrequency (determined by prior testing, as previously described), the laser scans should be able to detect differences in windshield displacement at the scanned locations, even in relatively high-eigenfrequency vibration modes.

After scanning the associated portions W1 and W2 of the vibrating windshield 212-2, and using one or more scans of the first portion W1 of the windshield, the noise frequency estimation module 117 may (in bock 620) estimate a displacement of the first portion W1 of the windshield. This may be done by determining a distance of the first portion W1 of the windshield from the first laser scanner 310 and subtracting this distance from the distance between the first laser scanner and the plane P1 when the windshield it is not vibrating. The distance of the first laser scanner 310 from the windshield when it is not vibrating may be confirmed by scanning the windshield when the first laser scanner is in its initial position with the windshield in a "rest" or non-vibrating state.

In addition, using one or more scans of the second portion of the windshield, the noise frequency estimation module 117 may (in bock 640) estimate a displacement of the second portion W2 of the windshield. This may be done by determining a distance of the second portion of the windshield from the second laser scanner 312 and subtracting this distance from the distance between the second laser scanner and the plane P1 when the windshield it is not vibrating. The distance of the second laser scanner 312 from the windshield when it is not vibrating may be confirmed by scanning the windshield when the second laser scanner is in its initial position with the windshield in a "rest" or non-vibrating state.

In one or more arrangements, multiple scans of the first and second portions of the windshield may be performed and analyzed to provide the windshield portion displacement estimates. Analysis of data from multiple scans may provide verification that the windshield is vibrating in a steady-state vibration mode, because the maximum displacements of the first and second portions of the windshield may not vary appreciably when the windshield is vibrating in a steady-state vibration mode. Multiple scans of the first and second portions of the windshield may also provide other data useful for generation of a noise-cancelling signal.

In one or more arrangements, if multiple scans of the first and second portions of the windshield are performed, the noise frequency estimation module 117 may assign an average of the maximum displacements determined by the multiple scans of the first windshield portion as a final working value for the first windshield portion displacement, for purposes of evaluating the displacements of the first and second windshield portions. The noise frequency estimation module 117 may also assign an average of the maximum displacements determined by the multiple scans of the second windshield portion as a final working value for the second windshield portion displacement. Other methods of determining working values of the first and second windshield portions may also be used.

After estimating the displacements of the first and second portions of the windshield, the noise frequency estimation module 117 may (in block 650) compare the estimated displacement of the first portion of the windshield with the estimated displacement of the second portion of the windshield. If the estimated displacement of the first portion of the windshield is greater than the estimated displacement of the second portion of the windshield, then the first laser scanner 310 may be estimated to reside closer to a localized maximum displacement of the windshield, because the first portion W1 of the windshield 212-2 is determined to be closer to the first laser scanner 310 than the second portion W2 of the windshield is to the second laser scanner 312. In this case, the noise frequency estimation module 117 may (in block 660) designate the first laser scanner 310 as the determined laser scanner. The "determined laser scanner" is the scanner determined to reside at a shorter distance from its associated portion of the vibrating windshield 212-2. The noise frequency estimation module 117 may also (in block 670) designate the first portion of the windshield as a latest scanned portion of the windshield. The designation in block 670 provides a reference displacement (i.e., the displacement of the first portion of the windshield) for further scans to determine the location of the localized maximum displacement. The estimated displacements of the scanned portions of the windshield may be correlated with associated relative positions of the laser scanners 310, 312 based on a positional reference. This information may be stored in a memory, such as windshield data 187 in data stores.

Returning to block 650, if the estimated displacement of the first portion of the windshield is not greater than the estimated displacement of the second portion of the windshield, the second laser scanner 312 may be estimated to reside closer to a localized maximum displacement of the windshield than the first laser scanner (or at least as close to a localized maximum displacement of the windshield as the first laser scanner). In such a case, the noise frequency estimation module 117 may (in block 665) designate the second laser scanner as the determined laser scanner. Simultaneously with block 665, the noise frequency estimation module 117 may (in block 675) designate the second portion of the windshield as a latest scanned portion of the windshield.

FIG. 8 shows operation of an embodiment of the noise frequency estimation module 117 to control operation of the determined laser scanner to incrementally scan additional portions of the windshield in a direction away from the other scanner, to locate the localized maximum displacement D1 closest to the determined scanner.

FIGS. 3A, 3B, and 8, the noise frequency estimation module 117 may be configured to assume, when the first laser scanner 310 is estimated to reside closer to a localized maximum displacement of the windshield 212-2, that movement of the closer laser scanner (in this case, scanner 310) in a direction F2 away from the other laser scanner 312 (whose associated portion of the windshield is farther from the other scanner) will locate a localized maximum displacement more quickly than movement of the other scanner 312 or movement of the closer scanner 310 in a direction toward the other scanner. Similarly, the noise frequency estimation module 117 may be configured to assume, when the second laser scanner 312 is estimated to reside closer to a localized maximum displacement of the windshield 212-2, that movement of the closer laser scanner (in this case, scanner 312) in a direction F3 away from the other laser scanner 310 (whose associated portion of the windshield is farther from the other scanner) will locate a localized maximum displacement more quickly than movement of the other scanner 310 or movement of the closer scanner 312 in a direction toward the other scanner.

Referring to FIGS. 3A, 3B, and 8, in the example shown, the noise frequency estimation module 117 may determine from scan data in FIG. 3A that the second laser scanner 312 is closer to a localized maximum displacement D1 than the first scanner 310. Referring to FIGS. 3B and 8, based on this assessment, the noise frequency estimation module 117 may (in block 810) control operation of the estimated laser scanner 312 to scan another portion W3 of the windshield 212-2 residing in the movement direction F3 with respect to the latest scanned portion W2 of the windshield. That is, the second laser scanner 312 may be controlled to move incrementally in direction F3 a predetermined amount R1. Laser scanners 310 and 312 may be configured to remain facing in direction F1 directly toward the windshield 212 during movement of the scanners along the track 320. The predetermined amount R1 may be a relatively smaller fraction of the wavelength λ1 (for example, 0.05×λ1). The predetermined amount R1 may depend on the wavelength λ1, with smaller values of the predetermined amount providing greater resolution at shorter wavelengths.

Using at least one laser scan of the other portion W3 of the windshield 212-2, the noise frequency estimation module 117 may estimate (in block 820) a displacement of the other portion W3 of the windshield. The noise frequency estimation module 117 may then (in block 830) compare the displacement of the other portion W3 of the windshield 212-2 with the displacement of the latest scanned portion W2 of the windshield. If the displacement of the other portion W3 of the windshield 212-2 is not greater than the displacement of the latest scanned portion W2 of the windshield, the noise frequency estimation module 117 may assume that the localized maximum displacement has been passed by movement of the scanner 312 in direction F3, and that the localized maximum displacement lies somewhere between the latest scanned portion W2 of the windshield and the other portion W3 of the windshield. Then, the noise frequency estimation module 117 may (in block 840) use data from at least one laser scan of the latest scanned portion W2 of the windshield to estimate a frequency of the noise (i.e., the localized maximum displacement is taken to be located at or near the latest scanned portion W2 of the windshield).

However, if the displacement of the other portion of the windshield W3 is greater than the displacement of the latest scanned portion W2 of the windshield, the noise frequency estimation module 117 may assume that the localized maximum displacement has not yet been located. The noise frequency estimation module 117 may then (in block 850) designate the other portion W3 of the windshield as the new latest scanned portion of the windshield. The noise frequency estimation module 117 may then repeat steps 810-850, repeatedly incrementally moving the laser scanner 312 again in direction F3 and scanning a new portion of the windshield until the localized maximum displacement is located as previously described.

Operation of the embodiment shown in FIGS. 4A-4B may be substantially the same as in the embodiment shown in FIGS. 3A-3B, with the statically-mounted emitters 410-e, 412-e initially scanning the portions of the windshield directly in front of them as previously described to determine the emitter closest to a localized maximum displacement. A static photodetector (not shown) associated with each of emitters 410-e, 412-e may be configured to receive light reflected from the windshield when the emitters are pointed straight ahead. In addition, the laser beams/pulses emitted by an emitter of the determined laser scanner (for example, by emitter 412-e in FIGS. 4A-4B) may be redirected by mirrors or other light steering mechanisms controlled by the noise frequency estimation module 117, to incrementally move or relocate the windshield scan areas in the desired movement direction along the windshield to additional scanning locations such as W3 as previously described. More specifically, the steering angle μ of the laser beam/pulses may be adjusted as shown in FIG. 4B (depending on the distance of the emitter 412-e from the vibrating windshield) to incrementally relocate the portion of the windshield that is scanned, by the distance R1 in direction F3 as described previously with respect to FIGS. 3A-3B. The positions of the movable photodetector(s) (such as photodetector 412-p in FIG. 4B moving in direction F3) may be autonomously controlled by the noise frequency estimation module 117 to intercept light emitted by the associated emitter (such as 412-e in FIG. 4B) and reflected from the windshield, responsive to the steering angle μ in which the light is emitted from the emitter of the determined laser scanner.

FIG. 9 is a flow diagram illustrating operation of an embodiment of the active windshield noise mitigation system responsive to detection of a predetermined level of windshield noise in the occupant compartment.

In block 814, the noise mitigation module 160 may determine if windshield noise is currently occurring. The occurrence of a windshield noise may be detected by windshield noise detection sensors 185 as previously described. If it is determined that windshield noise is currently occurring, the noise mitigation module 160 may (in block 816) determine if a noise level of the windshield noise is above a predetermined threshold. If the level of the windshield noise is not above the predetermined threshold, the noise mitigation module 160 may (in block 820) determine if a noise-canceling sound is currently being generated by the sound wave generator 148. If a noise-canceling sound is currently being generated while the level of the noise is less than the predetermined threshold, the noise mitigation module 160 may (in block 822) stop generation of the noise-canceling sound. This function discontinues generation of the noise-canceling sound whenever the windshield noise sound level falls below the predetermined threshold. Control may then pass to block 814, where the windshield noise mitigation module 160 may continue to monitor whether or not a windshield noise is occurring.

Returning to block 816, if the windshield noise level is above the predetermined threshold, the noise mitigation module 160 may (in block 824) determine if a noise-canceling sound is currently being generated. If a noise-canceling sound is currently not being generated with the noise level above the predetermined threshold, the noise mitigation module 160 may (in block 827, and using the estimated frequency f1 and any other pertinent information) determine characteristics of a sound configured to cancel a windshield noise. In one or more arrangements, the canceling sound may have the frequency f1 and be equal in amplitude but opposite in phase to the windshield noise. In cases where the windshield noise is detected by buffeting noise detection sensors 185, the sensors may provide additional details (such as amplitude and/or phase information, aside from the frequency f1) regarding the windshield noise, which may be useful in generating a noise canceling sound. The noise mitigation module 160 may then (in block 828) control operation of the noise cancelling signal generating system 142 to generate a sound having the characteristics configured to cancel the windshield noise.

In one or more arrangements, the input system 130 may be configured to enable a vehicle operator to specify one or more operating conditions of a system for actively mitigating a windshield noise as described herein. For example, as shown in FIG. 9, the operator may specify that the system will autonomously operate in a first operational mode to generate a noise canceling signal if a windshield noise is detected in the occupant compartment by the noise detection sensors 185, and a level of the noise is above a predetermined sound level threshold.

In other aspects, disclosed herein is a method of actively mitigating noise caused by vibration of a thin vehicle front windshield in an occupant compartment of a vehicle. The method may include steps of autonomously controlling each laser scanner of the pair of laser scanners to scan an associated initial portion of the windshield and, using laser scans of the initial portions of the windshield, determining a laser scanner of the pair of laser scanners that currently resides closest to a localized maximum displacement of the windshield. Operation of the determined laser scanner may be autonomously controlled to progressively scan the windshield in a movement direction away from the other laser scanner until a location of the localized maximum displacement is determined. Using data acquired from at least one laser scan of the windshield at the location of the localized maximum displacement, a frequency of the noise may be estimated. Using the estimated frequency of the noise, characteristics of a sound configured to cancel the noise may be determined. Operation of a noise cancelling signal generating system may then be controlled to generate the sound having characteristics configured to cancel the noise.

The step of autonomously controlling each laser scanner of the pair of laser scanners to scan an associated initial portion of the windshield may include steps of controlling operation of a first laser scanner of the pair of laser scanners to scan a first portion of the windshield, and controlling operation of a second laser scanner of the pair of laser scanners to scan a second portion of the windshield.

The step of determining a laser scanner of the pair of laser scanners that currently resides closest to a localized maximum displacement of the windshield may include steps of using at least one laser scan of the first portion of the windshield, estimating a displacement of the first portion of the windshield, and using at least one laser scan of the second portion of the windshield, estimating a displacement of the second portion of the windshield. The estimated displacement of the first portion of the windshield may be compared with the estimated displacement of the second portion of the windshield. If the estimated displacement of the first portion of the windshield is greater than the estimated displacement of the second portion of the windshield, the first portion of the windshield may be designated as a latest scanned portion of the windshield, and the first laser scanner may be designated as a determined laser scanner.

If the estimated displacement of the second portion of the windshield is greater than the estimated displacement of the first portion of the windshield, the second portion of the windshield may be designated as the latest scanned portion of the windshield, and the second laser scanner may be designated as the determined laser scanner.

The step of autonomously controlling operation of the determined laser scanner to progressively scan the windshield in a movement direction away from the other laser scanner until a location of the localized maximum displacement is determined may include steps of (a) controlling operation of the determined laser scanner to scan another portion of the windshield residing in the movement direction with respect to the latest scanned portion of the windshield; and (b) using at least one laser scan of the other portion of the windshield, estimating a displacement of the other portion of the windshield. The step of autonomously controlling operation of the determined laser scanner to progressively scan the windshield may also include steps of (c) comparing the estimated displacement of the other portion of the windshield with the estimated displacement of the latest scanned portion of the windshield; and (d) if the estimated displacement of the other portion of the windshield is not greater than the estimated displacement of the latest scanned portion of the windshield, using data from at least one laser scan of the latest scanned portion of the windshield to estimate a frequency of the noise. The step of autonomously controlling operation of the determined laser scanner to progressively scan the windshield may also include steps of (e) if the estimated displacement of the other portion of the windshield is greater than the estimated displacement of the latest scanned portion of the windshield, designating the other portion of the windshield as the latest scanned portion of the windshield, and repeating steps (a)-(e) described above.

The step of controlling operation of the determined laser scanner to scan another portion of the windshield may include controlling the determined laser scanner to move the determined laser scanner along a track extending laterally with respect to the vehicle so that an emitter of the determined laser scanner faces the other portion of the windshield. Alternatively, the step of controlling operation of the determined laser scanner to scan another portion of the windshield may include controlling operation of a beam guidance mechanism to redirect light from an emitter of the determined laser scanner to the other portion of the windshield, and controlling movement of an associated photodetector of the determined laser scanner to position the photodetector to receive light emitted by the emitter and reflected by the windshield.

The step of controlling operation of the noise cancelling signal generating system may include the step of controlling operation of the signal generating system to generate the sound when a noise level detected within the occupant compartment is above a predetermined threshold. The step of controlling operation of the noise cancelling signal generating system may also include the step of controlling operation of the signal generating system to stop generation of the sound if the noise level falls below the predetermined threshold.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module, as envisioned by the present disclosure, is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the operator's computer, partly on the operator's computer, as a stand-alone software package, partly on the operator's computer and partly on a remote computer, or entirely on the remote computer or server. In the latter scenario, the remote computer may be connected to the operator's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for actively mitigating noise caused by vibration of a thin vehicle front windshield in an occupant compartment of a vehicle, the system comprising:
   a pair of laser scanners configured to be mountable inside the vehicle occupant compartment, each laser scanner of the pair of laser scanners being configurable to scan an associated initial portion of the windshield simultaneously with the other laser scanner of the pair of laser scanners, when the windshield is vibrating;
   one or more processors; and
   a memory communicably coupled to the one or more processors and storing a noise frequency estimation module including computer-readable instructions that when executed by the one or more processors cause the one or more processors to:
   autonomously control each laser scanner of the pair of laser scanners to scan the associated initial portion of the windshield;
   using laser scans of the initial portions of the windshield, determine a laser scanner of the pair of laser scanners that currently resides closest to a localized maximum displacement of the windshield;
   autonomously control operation of the determined laser scanner to progressively scan the windshield in a movement direction away from the other laser scanner until a location of the localized maximum displacement is determined; and
   using data acquired from at least one laser scan of the windshield at the location of the localized maximum displacement, estimate a frequency of the noise.

2. The system of claim 1 wherein the laser scanners of the pair of laser scanners are configured so that an initial spacing between laser pulses emitted by associated emitters of the laser scanners of the pair of laser scanners is in a range of 0.2-0.3 times a predetermined wavelength corresponding to a highest eigenfrequency of the windshield expected to be experienced by the windshield during operation of the vehicle.

3. The system of claim 1 wherein the memory stores a noise mitigation module including computer-readable instructions that when executed by the one or more processors cause the one or more processors to:
   using the estimated frequency of the noise, determine characteristics of a sound configured to cancel the noise; and
   control operation of a noise cancelling signal generating system to generate the sound having characteristics configured to cancel the noise when a noise level detected within the occupant compartment is above a predetermined threshold.

4. The system of claim 3 wherein the noise mitigation module includes computer-readable instructions that when executed by the one or more processors cause the one or more processors to control operation of the signal generating system to stop generation of the sound if the noise level falls below the predetermined threshold.

5. The system of claim 1 wherein the noise frequency estimation module includes computer-readable instructions that when executed by the one or more processors cause the one or more processors to:
   control operation of a first laser scanner of the pair of laser scanners to scan a first portion of the windshield;
   control operation of a second laser scanner of the pair of laser scanners to scan a second portion of the windshield;
   using at least one laser scan of the first portion of the windshield, estimate a displacement of the first portion of the windshield;
   using at least one laser scan of the second portion of the windshield, estimate a displacement of the second portion of the windshield,
   compare the estimated displacement of the first portion of the windshield with the estimated displacement of the second portion of the windshield;
   if the estimated displacement of the first portion of the windshield is greater than the estimated displacement of the second portion of the windshield:
   designate the first portion of the windshield as a latest scanned portion of the windshield; and
   designate the first laser scanner as a determined laser scanner;
   if the estimated displacement of the second portion of the windshield is greater than the estimated displacement of the first portion of the windshield:
   designate the second portion of the windshield as the latest scanned portion of the windshield; and
   designate the second laser scanner as the determined laser scanner.

6. The system of claim 5 wherein the noise frequency estimation module includes computer-readable instructions that when executed by the one or more processors cause the one or more processors to:
   (a) control operation of the determined laser scanner to scan another portion of the windshield residing in the movement direction with respect to the latest scanned portion of the windshield;
   (b) using at least one laser scan of the other portion of the windshield, estimate a displacement of the other portion of the windshield;
   (c) compare the estimated displacement of the other portion of the windshield with the estimated displacement of the latest scanned portion of the windshield;
   (d) if the estimated displacement of the other portion of the windshield is not greater than the estimated displacement of the latest scanned portion of the windshield, use data from at least one laser scan of the latest scanned portion of the windshield to estimate a frequency of the noise;
   (e) if the estimated displacement of the other portion of the windshield is greater than the estimated displacement of the latest scanned portion of the windshield:

designate the other portion of the windshield as the latest scanned portion of the windshield; and repeat steps (a)-(e).

7. The system of claim 6 wherein controlling operation of the determined laser scanner to scan another portion of the windshield includes controlling the determined laser scanner to move the determined scanner along a track extending laterally with respect to the vehicle so that an emitter of the determined laser scanner faces the other portion of the windshield.

8. The system of claim 6 wherein controlling operation of the determined laser scanner to scan another portion of the windshield includes controlling operation of a beam guidance mechanism to redirect light from an emitter of the determined laser scanner to the other portion of the windshield, and controlling movement of an associated photodetector of the determined laser scanner to position the associated photodetector to receive light emitted by the emitter and reflected by the windshield.

9. The system of claim 1 wherein each laser scanner of the pair of laser scanners is mounted in the vehicle so as face in a forward direction of the vehicle, each laser scanner of the pair of laser scanners is structured to be independently movable along a track extending laterally with respect to the vehicle.

10. The system of claim 1 wherein each laser scanner of the pair of laser scanners includes:
an emitter;
a beam guidance mechanism configured to redirect a light emitted by the emitter without moving the emitter; and
an associated photodetector structured to be movable independently of the emitter along a track extending laterally with respect to the vehicle.

11. A method for actively mitigating noise caused by vibration of a thin vehicle front windshield in an occupant compartment of a vehicle, comprising steps of:
autonomously controlling each laser scanner of a pair of laser scanners to scan an associated initial portion of the windshield;
using laser scans of the initial portions of the windshield, determining a laser scanner of the pair of laser scanners that currently resides closest to a localized maximum displacement of the windshield;
autonomously controlling operation of the determined laser scanner to progressively scan the windshield in a movement direction away from the other laser scanner until a location of the localized maximum displacement is determined;
using data acquired from at least one laser scan of the windshield at the location of the localized maximum displacement, estimating a frequency of the noise;
using the estimated frequency of the noise, determining characteristics of a sound configured to cancel the noise; and
controlling operation of a noise cancelling signal generating system to generate the sound having characteristics configured to cancel the noise.

12. The method of claim 11 wherein the step of autonomously controlling each laser scanner of the pair of laser scanners to scan an associated initial portion of the windshield comprises steps of:
controlling operation of a first laser scanner of the pair of laser scanners to scan a first portion of the windshield; and
controlling operation of a second laser scanner of the pair of laser scanners to scan a second portion of the windshield.

13. The method of claim 12 wherein the step of determining a laser scanner of the pair of laser scanners that currently resides closest to a localized maximum displacement of the windshield comprises steps of:
using at least one laser scan of the first portion of the windshield, estimating a displacement of the first portion of the windshield;
using at least one laser scan of the second portion of the windshield, estimating a displacement of the second portion of the windshield,
comparing the estimated displacement of the first portion of the windshield with the estimated displacement of the second portion of the windshield;
if the estimated displacement of the first portion of the windshield is greater than the estimated displacement of the second portion of the windshield:
designating the first portion of the windshield as a latest scanned portion of the windshield; and
designating the first laser scanner as a determined laser scanner;
if the estimated displacement of the second portion of the windshield is greater than the estimated displacement of the first portion of the windshield:
designating the second portion of the windshield as the latest scanned portion of the windshield; and
designating the second laser scanner as the determined laser scanner.

14. The method of claim 13 wherein the step of autonomously controlling operation of the determined laser scanner to progressively scan the windshield in a movement direction away from the other laser scanner until a location of the localized maximum displacement is determined comprises steps of:
(a) controlling operation of the determined laser scanner to scan another portion of the windshield residing in the movement direction with respect to the latest scanned portion of the windshield;
(b) using at least one laser scan of the other portion of the windshield, estimating a displacement of the other portion of the windshield;
(c) comparing the estimated displacement of the other portion of the windshield with the estimated displacement of the latest scanned portion of the windshield;
(d) if the estimated displacement of the other portion of the windshield is not greater than the estimated displacement of the latest scanned portion of the windshield, using data from at least one laser scan of the latest scanned portion of the windshield to estimate a frequency of the noise;
(e) if the estimated displacement of the other portion of the windshield is greater than the estimated displacement of the latest scanned portion of the windshield:
designating the other portion of the windshield as the latest scanned portion of the windshield; and
repeating steps (a)-(e).

15. The method of claim 14 wherein the step of controlling operation of the determined laser scanner to scan another portion of the windshield includes controlling the determined laser scanner to move the determined laser scanner along a track extending laterally with respect to the vehicle so that an emitter of the determined laser scanner faces the other portion of the windshield.

16. The method of claim 14 wherein the step of controlling operation of the determined laser scanner to scan another portion of the windshield includes controlling operation of a beam guidance mechanism to redirect light from an emitter of the determined laser scanner to the other portion of the windshield, and controlling movement of an associated photodetector of the determined laser scanner to position the associated photodetector to receive light emitted by the emitter and reflected by the windshield.

17. The method of claim 11 wherein the step of controlling operation of a noise cancelling signal generating system comprises the step of controlling operation of the signal generating system to generate the sound when a noise level detected within the occupant compartment is above a predetermined threshold.

18. The method of claim 17 wherein the step of controlling operation of a noise cancelling signal generating system further comprises the step of controlling operation of the signal generating system to stop generation of the sound if the noise level falls below the predetermined threshold.

19. A non-transitory computer-readable medium for actively mitigating noise caused by vibration of a thin vehicle front windshield in an occupant compartment of a vehicle and storing instructions that when executed by one or more processors cause the one or more processors to:

autonomously control each laser scanner of a pair of laser scanners to scan an associated initial portion of the windshield;
using laser scans of the initial portions of the windshield, determine a laser scanner of the pair of laser scanners that currently resides closest to a localized maximum displacement of the windshield;
autonomously control operation of the determined laser scanner to progressively scan the windshield in a movement direction away from the other laser scanner until a location of the localized maximum displacement is determined;
using data acquired from at least one laser scan of the windshield at the location of the localized maximum displacement, estimate a frequency of the noise;
using the estimated frequency of the noise, determine characteristics of a sound configured to cancel the noise; and
control operation of a noise cancelling signal generating system to generate the sound having characteristics configured to cancel the noise.

* * * * *